United States Patent
Mukherjee et al.

(10) Patent No.: US 11,958,439 B2
(45) Date of Patent: *Apr. 16, 2024

(54) METHODS AND SYSTEMS FOR DRIVER IDENTIFICATION

(71) Applicant: BlackBerry Limited, Waterloo (CA)

(72) Inventors: Biswaroop Mukherjee, Stittsville (CA); Anish Agrawal, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,833

(22) Filed: Mar. 1, 2023

(65) Prior Publication Data

US 2023/0202428 A1 Jun. 29, 2023

Related U.S. Application Data

(63) Continuation of application No. 16/734,051, filed on Jan. 3, 2020, now Pat. No. 11,618,413.

(51) Int. Cl.
| | |
|---|---|
| *B60R 25/24* | (2013.01) |
| *B60R 25/045* | (2013.01) |
| *B60R 25/08* | (2006.01) |
| *B60R 25/10* | (2013.01) |
| *B60R 25/102* | (2013.01) |
| *B60R 25/31* | (2013.01) |
| *B60R 25/34* | (2013.01) |
| *G06N 20/00* | (2019.01) |

(52) U.S. Cl.
CPC ............ *B60R 25/24* (2013.01); *B60R 25/045* (2013.01); *B60R 25/08* (2013.01); *B60R 25/102* (2013.01); *B60R 25/31* (2013.01); *B60R 25/34* (2013.01); *G06N 20/00* (2019.01); *B60R 2025/1016* (2013.01)

(58) Field of Classification Search
None
See application file for complete search history.

(56) References Cited

U.S. PATENT DOCUMENTS

| | | | | |
|---|---|---|---|---|
| 9,390,558 | B2 * | 7/2016 | O'Brien | G06T 19/00 |
| 9,707,911 | B1 * | 7/2017 | Myers | B60R 16/037 |
| 9,779,565 | B2 * | 10/2017 | Rabbat | G08C 17/02 |
| 9,809,196 | B1 * | 11/2017 | Penilla | B60L 53/305 |

(Continued)

FOREIGN PATENT DOCUMENTS

| | | |
|---|---|---|
| CN | 103035048 A | 4/2013 |
| CN | 105365708 A | 3/2016 |

(Continued)

OTHER PUBLICATIONS

International Search Report and Written Opinion, PCT Application No. PCT/CA2020/051774, dated Mar. 16, 2021.

(Continued)

*Primary Examiner* — Fekadeselassie Girma
(74) *Attorney, Agent, or Firm* — Moffat & Co

(57) ABSTRACT

A method at a vehicle computing device for identifying a driver, the method including receiving a first indicator at the vehicle computing device; obtaining, based on the first indicator, a presumed driver identity; receiving at least one second indicator at the vehicle computing device; and verifying the presumed driver identity using the at least one second indicator.

17 Claims, 4 Drawing Sheets

(56) References Cited

U.S. PATENT DOCUMENTS

| | | | | |
|---|---|---|---|---|
| 10,017,153 | B1* | 7/2018 | Potter | B60R 25/04 |
| 10,154,029 | B1* | 12/2018 | Griffin | H04L 63/06 |
| 10,315,665 | B2* | 6/2019 | Halder | G05D 1/021 |
| 10,464,530 | B2* | 11/2019 | Falkson | B60R 25/257 |
| 10,503,990 | B2* | 12/2019 | Gleeson-May | G06V 20/597 |
| 11,172,339 | B1* | 11/2021 | Hummer | G01S 19/39 |
| 11,618,413 | B2* | 4/2023 | Mukherjee | B60R 25/31 |
| | | | | 340/426.1 |
| 2004/0217850 | A1* | 11/2004 | Perttunen | B60R 25/257 |
| | | | | 340/5.2 |
| 2012/0215375 | A1* | 8/2012 | Chang | B60W 50/14 |
| | | | | 701/1 |
| 2014/0041301 | A1* | 2/2014 | Oakley | E05B 81/74 |
| | | | | 49/506 |
| 2015/0045984 | A1* | 2/2015 | Hui | B60N 2/002 |
| | | | | 701/1 |
| 2015/0091713 | A1* | 4/2015 | Kohlenberg | B60R 25/24 |
| | | | | 340/426.36 |
| 2015/0191178 | A1* | 7/2015 | Roy | H04W 4/027 |
| | | | | 701/36 |
| 2015/0242605 | A1* | 8/2015 | Du | G06F 21/32 |
| | | | | 726/7 |
| 2015/0283902 | A1* | 10/2015 | Tuukkanen | G06V 20/597 |
| | | | | 340/461 |
| 2016/0001782 | A1* | 1/2016 | Fiedler | B60W 40/09 |
| | | | | 340/5.81 |
| 2016/0086397 | A1* | 3/2016 | Phillips | G07C 5/008 |
| | | | | 701/1 |
| 2016/0300050 | A1* | 10/2016 | Hecht | H04W 12/06 |
| 2017/0186054 | A1* | 6/2017 | Fish | G06Q 30/0282 |
| 2017/0197568 | A1* | 7/2017 | DeCia | B60R 16/037 |
| 2017/0200336 | A1* | 7/2017 | Schmidt | G08C 17/02 |
| 2017/0232930 | A1* | 8/2017 | Murar | B60Q 5/005 |
| | | | | 340/5.61 |
| 2017/0320501 | A1* | 11/2017 | Li | B60K 37/06 |
| 2017/0361792 | A1* | 12/2017 | Lem | E05B 81/74 |
| 2017/0369071 | A1* | 12/2017 | Gould | B60R 25/24 |
| 2018/0018179 | A1* | 1/2018 | Scheufler | H04L 67/306 |
| 2018/0229752 | A1* | 8/2018 | Chascsa, II | B60K 35/00 |
| 2018/0262738 | A1* | 9/2018 | Kapuria | H04N 23/51 |
| 2018/0304906 | A1* | 10/2018 | Powell | B60K 35/00 |
| 2018/0339708 | A1* | 11/2018 | Geller | B60L 3/0015 |
| 2019/0066424 | A1* | 2/2019 | Hassani | B60R 25/252 |
| 2019/0133511 | A1* | 5/2019 | Migneco | A61B 5/4064 |
| 2019/0227954 | A1* | 7/2019 | Shi | G06F 13/102 |
| 2020/0160263 | A1* | 5/2020 | Kuettner | G06Q 10/0832 |
| 2020/0276503 | A1* | 9/2020 | Marchiorello | A63F 13/212 |
| 2020/0310528 | A1* | 10/2020 | Upmanue | A61B 5/4803 |
| 2020/0334581 | A1* | 10/2020 | Skaling | G06Q 10/02 |
| 2020/0349666 | A1* | 11/2020 | Hodge | G08G 1/017 |
| 2020/0364967 | A1* | 11/2020 | Spice | G06F 3/017 |
| 2021/0206346 | A1* | 7/2021 | Mukherjee | B60R 25/102 |
| 2021/0272125 | A1* | 9/2021 | Kopf | G06Q 20/38215 |
| 2021/0398691 | A1* | 12/2021 | Dhamija | G16H 50/80 |
| 2023/0202428 | A1* | 6/2023 | Mukherjee | B60R 25/34 |
| | | | | 340/426.1 |

FOREIGN PATENT DOCUMENTS

| | | |
|---|---|---|
| WO | 2017127053 A1 | 7/2017 |
| WO | 2019152471 A2 | 8/2019 |

OTHER PUBLICATIONS

China State Intellectual Property Office Office Action for Application No. 202080091677.4 dated Nov. 9, 2023, 8 pages.
European Patent Office (EPO) Extended European Search Report (EESR) for Application No. 20911136.8 dated Jan. 8, 2024, 8 pages.

* cited by examiner

METHODS AND SYSTEMS FOR DRIVER IDENTIFICATION

FIELD OF THE DISCLOSURE

The present disclosure relates to vehicle systems and in particular relates to identification of a driver within such vehicle systems.

BACKGROUND

The identification of a driver of a vehicle may be important in a number of circumstances. For example, a person may be stealing the vehicle and identification that the person is not an authorized driver may be used to help prevent theft or to take action when such theft has occurred, thus being beneficial to the vehicle owner.

In other cases, a driver may be a known driver that is performing actions that are not permitted or are not desired by the vehicle owner. For example, a known driver may be the teenage child of the vehicle owner, who may have a restricted license and therefore should not enter a freeway.

In other cases, the driver may be an employee of a company who is using a pool vehicle not assigned to such employee.

While systems exist to identify drivers, such identification may be slow and ineffective. Further, in some cases identification of a driver may lead to privacy concerns, such as for example, by using cameras, which legitimate drivers may be unwilling to use.

BRIEF DESCRIPTION OF THE DRAWINGS

The present disclosure will be better understood with reference to the drawings, in which:

FIG. 2 is block diagram showing a state machine having various states that a computing device on a vehicle can be in;

DETAILED DESCRIPTION OF THE DRAWINGS

Figure 1:
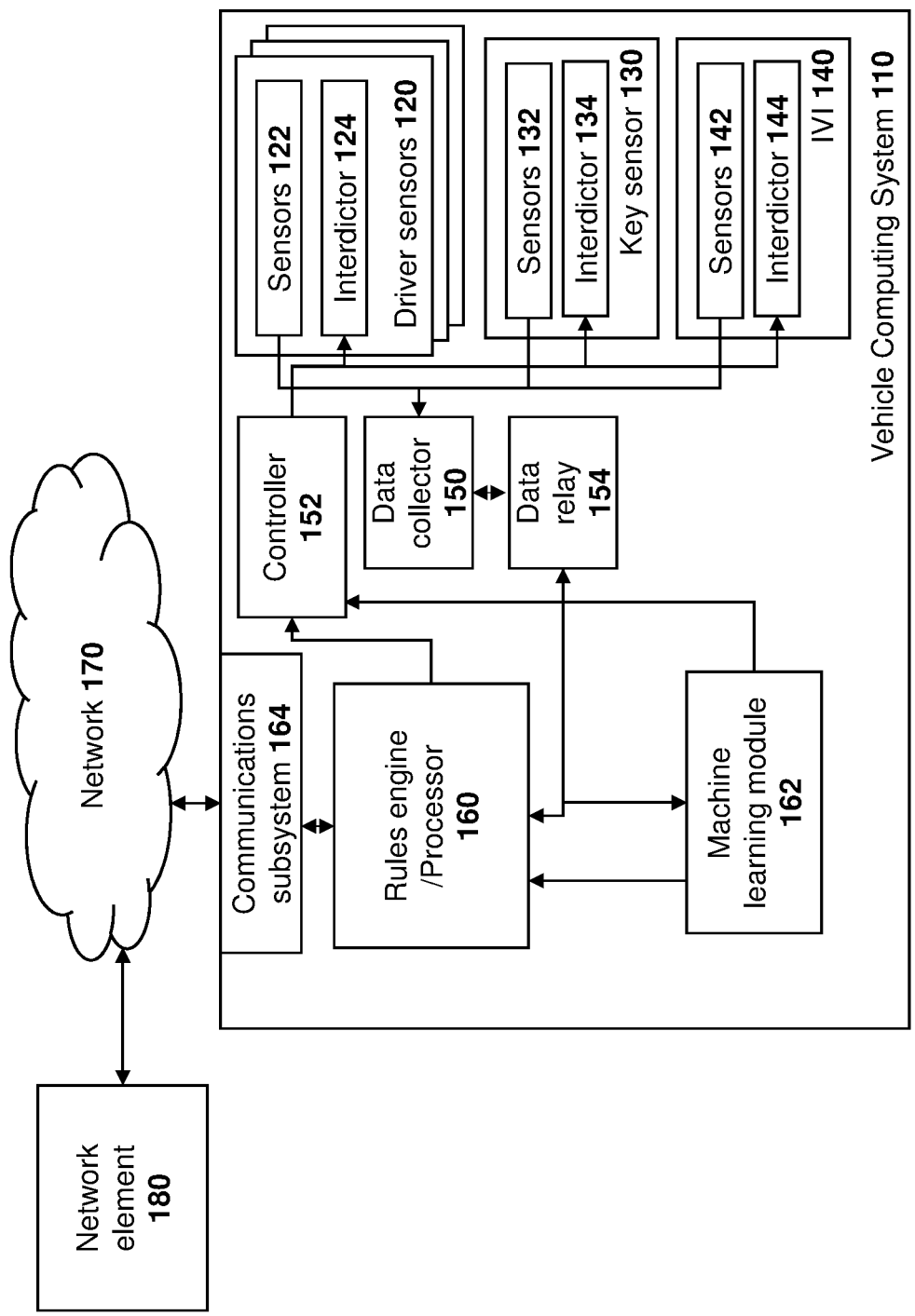
FIG. 1 is a block diagram of an example vehicle system capable of being used with the present disclosure.

The present disclosure provides a method at a vehicle computing device for identifying a driver, the method comprising: receiving a first indicator at the vehicle computing device; obtaining, based on the first indicator, a presumed driver identity; receiving at least one second indicator at the vehicle computing device; and verifying the presumed driver identity using the at least one second indicator.

The present disclosure further provides a vehicle computing device configured for identifying a driver, the vehicle computing device comprising: a processor; and a communications subsystem, wherein the vehicle computing device is configured to: receive a first indicator at the vehicle computing device; obtain, based on the first indicator, a presumed driver identity; receive at least one second indicator at the vehicle computing device; and verify the presumed driver identity using the at least one second indicator.

The present disclosure further provides a computer readable medium for storing instruction code for identifying a driver, which, when executed by a processor of a vehicle computing device cause the vehicle computing device to: receive a first indicator at the vehicle computing device; obtain, based on the first indicator, a presumed driver identity; receive at least one second indicator at the vehicle computing device; and verify the presumed driver identity using the at least one second indicator.

While existing systems may be used to determine the identity of a driver based on sensor data and driving habits, it would be beneficial to shorten the time it takes to identify the driver as much as possible, especially in the situation of the theft of the vehicle.

Even if the driver is authorized to drive the vehicle, there are benefits to being able to determine who a driver is out of the number of authorized drivers in order to ensure that the vehicle is being used appropriately. For example, a younger driver may not be permitted to drive on highways. It would be advantageous for parents know if the young driver is borrowing a vehicle, and when and how such young driver is driving.

In the case of a company having a pool of vehicles and a number of drivers, it would be advantageous to correctly identify the driver of the vehicle to track driving behavior correctly and to ensure that restrictions such as the maximum permitted load are being adhered to. The check could also ensure the correct driver has collected the correct vehicle/load.

Therefore, in accordance with the embodiments of the present disclosure, a first device is used as a first indicator to provide an initial, strong, indication of who an expected driver is. Such first indicator could be a smart key, a key fob or another mobile device that communicates with vehicle computing system. For example, a key fob or mobile device may communicate wirelessly with the vehicle computing system and provide an identifier to uniquely identify such mobile device or key fob to the vehicle computing system. A smart key, upon insertion into the vehicle, may similarly provide a unique identification to the vehicle computing system. However, other options for the first indicator are possible and the present disclosure is not limited to any particular first indicator.

Each driver assigned to the vehicle has their own first indicator, which may be a device such as a smart key, key fob or mobile device, or may be a code or password, for example entered in a keypad or on a console of the vehicle. In this regard, the vehicle computing device may, upon detecting the first indicator, have an expectation that the user of such key fob or mobile device is the authorized driver associated with that first indicator.

Thereafter, secondary indicators may be used to verify the identity of the driver. Such secondary indicators may include other received sensor data, which may be used alone or in combination to create a profile of the current driver that could then be utilized to indicate whether the presumed identity of the driver was correct. In this way, the methods and systems described below reduce the time it takes to verify the identity of the current driver, especially in a vehicle which is associated with many authorized drivers.

For example, in the situation of fleet of vehicles and a plurality of drivers, for N drivers, each of whom has their own key fob or other strong indicator and who have their own driver persona, there would be $N^2$ possible combination of drivers with key fobs. Either the parties have the correct key fob, or they do not. Such intensive driver identification mechanisms may benefit from a reduction of this large search space.

Therefore, starting with the presumed driver identity through the strong indicator also allows additional sensor data to be applied quickly in a meaningful manner. For example, such additional sensor data may be associated with physical components within the vehicle. Thus, the seat and/or mirror positions may be associated with a particular driver, and if a current driver moves the seats or mirrors from such positions on entering the vehicle, this may be an indication that the current driver is not the driver associated with the strong indicator such as the key fob. This may mean that the current driver is stealing the vehicle or may be another authorized driver who is using the wrong key fob or strong indicator. This holds true even in the case of theft caused by key fob spoofing.

In other cases, other secondary information may be other devices pairing with a vehicle. These other devices could also be an indicator to identify the driver and act as a trigger if there is a mismatch. For example, if the first, strong indicator is a key fob, a secondary indicator may be a mobile device which may be paired with the infotainment system of the vehicle. If the mobile device that is paired with the infotainment system is not the expected mobile device, this may be an indicator that there is driver mismatch.

In other cases, driving patterns may be utilized to identify the driver. Such driving patterns may be based on acceleration, braking, speed, or other profiles for the driver which may be learned using a machine learning algorithm and then associated with the driver. Such machine learning algorithms could benefit from having a strong indicator providing a presumed driver identity in order to determine whether mismatch exists or not prior to identifying which other driver, if any, from among authorized drivers is driving the vehicle.

Thus, in accordance with the embodiments of the present disclosure, rather than merely analyzing sensor data to determine who the driver is, a strong initial indicator, such as a key fob or code, is utilized. Subsequently, indications of unexpected variations in secondary indicators are looked for or analyzed to serve as a trigger to verify the identification process. This can result in quicker identification of mismatches between an expected driver and a current driver. For example, in some cases the present embodiments may determine a mismatch between the current driver and the presumed driver even before the current driver leaves the driveway, thus allowing an action such as the disabling of the vehicle to occur.

In other cases, other actions may be performed on detecting a mismatch between the presumed driver and the current driver. Such actions may include reporting the mismatch to authorities, fleet operation systems, authorized users of the vehicle, among other personnel. In other cases, other actions may also be taken. In the case of a fleet driver using the wrong key fob, the performance of such driver may be recorded, and driver's performance can be assessed against the actual driver and not against the driver associated with that the key fob or other strong indicator.

In other cases, other systems within the vehicle may be used for the actions, such as by applying brakes or by displaying information on the console of the vehicle. Other actions are possible.

These and other embodiments are described below. Reference is now made to FIG. 1, which shows an exemplary vehicle computing system that can be used in the embodiments of the present disclosure. In the example of FIG. 1, a vehicle computing system 110 includes a plurality of sensors. Such sensors may be associated with an electronic control unit (ECU) in some cases. For example, in the embodiment of FIG. 1, a plurality of driver sensor units 120 are shown, each having sensors 122. Such sensors may include sensors associated with the seats, mirrors, acceleration, brake pedal, vehicle position such as a Global Navigation Satellite system (GNSS), steering wheel sensors, weight sensors, pressure sensors on the steering wheel, among other options.

Further, as seen in the embodiment of FIG. 1, an interdictor 124 may be associated with the driver sensor unit 120 and may allow for certain actions to be taken such as disabling the accelerator, enabling a braking system, among other options. In particular, as used herein, An interdictor is a module that can perform an action to affect the behavior of the system under the command of the proposed analytics system.

In other cases, the sensors may include a key sensor unit 130 which may include an ignition or fob sensor 132. In some cases the key sensor unit 130 could sense codes or passwords, or mobile devices. Further, an interdictor 134 may allow for the disabling of the key to effectively turn the vehicle off.

In other cases, an in-vehicle infotainment system (IVI) unit 140 includes sensors 142 associated with the infotainment system. This may, for example, include a Bluetooth transceiver for pairing with external devices such as a mobile telephone. In other cases, sensors 142 may include information with regard to which station on a radio the driver tunes to, whether the driver is using a compact disc player or media streaming device including the identity of such media streaming device, equalizer settings for the sound system of the vehicle, among other options. In other cases, the sensors 142 may provide information on climate control settings within the vehicle. Other options for sensors 142 are also possible.

An interdictor 144 associated with IVI unit 140 may allow for voice commands or prompts to be made through the infotainment system, visual indicators to be placed on the infotainment system such as messages to the driver being displayed on a console, among other options.

A data collector 150 may collect data from the various systems. A controller 152 may further control the interdictors within the various sensor systems.

Data from the data collector 150 may optionally flow through a data relay 154 to a processor 160 such as a rules engine. The processor 160 may be a state machine engine and may make determinations on whether the driver of the vehicle is an authorized driver and what, if any, actions to perform. Such actions may, in some cases, be transmitted from processor 160 to controller 152.

Therefore, in accordance with the embodiments of the present disclosure, the processor 160 allows a quick evaluation of a first factor. This is typically implemented by a set of simple finite state machines, that have deterministic and short compute time given any input.

In some embodiments described below, a machine learning module 162 may have learned a driving profile of the various authorized drivers for the vehicle. Such machine learning module 162 may provide information to the processor 160 in order to allow the processor 160 to make determinations on the legitimacy of the driver of the vehicle. In practice, machine learning module 162 typically does the work of figuring out the more subtle factors than the first factor. A typical implementation for machine learning module 162 would be a neural network.

In some embodiments, the processor 160 may use a communications subsystem 164 to communicate with a network element 180 through a network 170. Network element 180 may be any server or cloud service. For example, the network element 180 may be a fleet management center, a notification system such as an email or text messaging system which may provide data to authorized drivers, a vehicle manufacturer system such as for example a Tesla™ system or an On-Star™ system for General Motors vehicles, among other options. Other options for the operator and the information provided for a network element 180 are possible.

Network 170 may, for example, be the Internet in some cases. In other cases, a network 170 may be any wired or wireless network that the vehicle computing system and may communicate with. For example, the network may include a wired system associated with the charging port on an electric vehicle in some cases. In other cases, the network may include a short-range wireless communications such as Wi-Fi if the vehicle is close to a building or house with a known Wi-Fi router. Other options are possible.

Thus, communications subsystem 164 could be any communications mechanism to allow for wired or wireless communication with network 170 including ethernet, Wi-Fi, near field communications (NFC), infra-red Data Association (iRDA), cellular communications, satellite communications, among others. The structure of communications subsystem 164 is dependent on the types of communications that the subsystem will perform.

Further, while the embodiment of FIG. 1 shows both processor 160 and machine learning module 162 within the vehicle computing system 110, in other cases, some or all of the functionality of these modules can be placed on network element 180 (for example in the cloud). Thus, in one case, machine learning module 162 may be completely in the cloud and communicate with processor 160 using communications subsystem 164. Other options are possible.

In accordance with the present disclosure, a strong indicator is first detected by the vehicle computing system to provide a presumption for the identity of a current driver. Then, a secondary indicator can be used to confirm the identity of the current driver. In this regard, reference is now made to FIG. 2, which shows a state machine for the various states for the vehicle computing system.

Figure 2:
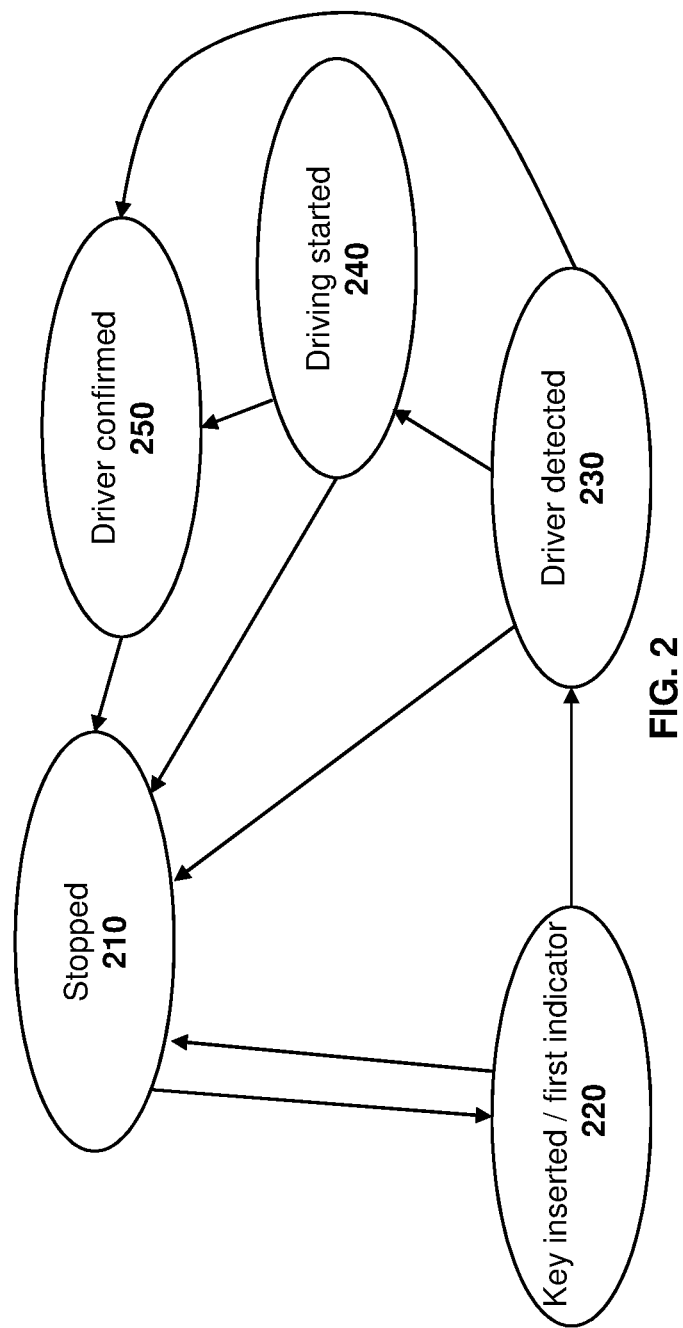

In the embodiment of FIG. 2, the vehicle is initially in a stopped (off) state 210.

When a key is inserted or the first indicator is detected, then the vehicle computing system transitions to state 220 showing that the key inserted or first indicator received. The computing device may then transition to state 230 in which the vehicle computing system has a presumptive identity for the current driver.

In order to verify the presumptive identity, the sensors within the vehicle computing system may be used to provide secondary indicators for the current driver. As indicated above, the secondary indicators could be seat or mirror positions, driving patterns based on historical patterns, for example using machine learning, secondary communications devices such as a mobile device associated with the user, among other factors.

In some cases the secondary factors require the vehicle to be driving. Therefore, once driving is detected then the state machine may transition to state 240.

Once the secondary factors are received and processed, the state machine transitions to state 250 in which a driver confirmed state is entered. This state may be entered from either state 230 directly (for example before driving starts) or from state 240 if secondary indicators include indicators found when the vehicle is driving. The driver confirmed state may be a verification of the presumptive driver, identification of another driver that is authorized to operate the vehicle but has a different first indicator device, or an indication that the driver is unknown.

From any of state 220, 230, 240 or 250, if the vehicle is stopped then the state machine may transition back to state 210.

Therefore, based on the embodiment of FIG. 2, various information from various sensors may be utilized to transition between the states.

Figure 3:
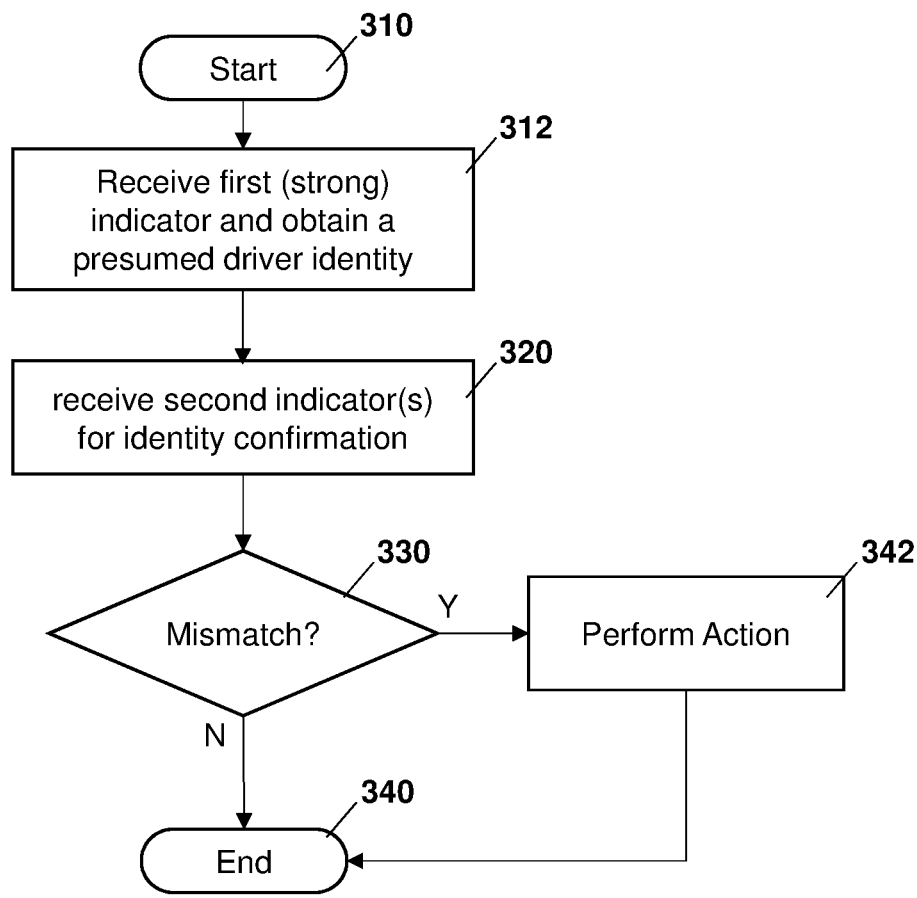
FIG. 3 is a process diagram showing a process for identifying a driver and performing an action based on such identification.

Reference is now made to FIG. 3, which shows a process at a vehicle system.

In accordance with the embodiment of FIG. 3, the process starts at block 310 and proceeds to block 312 in which the vehicle system or computing device on the vehicle detects a first strong indicator. As indicated above, in one embodiment, the first strong indicator may be a key fob associated with a particular driver. In other cases, the first strong indicator may be a mobile device associated with a driver. In other cases, the first indicator may be an intelligent key that can provide information to the vehicle computing system. In other cases, the strong indicator could be a code or password unique to a particular driver. Other options are possible.

The strong indicator may be configured at the time the vehicle is manufactured, by a dealership, by a vehicle owner, by a government agency, among other options.

For example, a vehicle may have four key fobs associated with it, which may be assigned to a particular set of users on the sale of the vehicle or configured after the sale of the vehicle. Other numbers of fobs associated with the vehicle are also possible.

The strong indicator at block 312 allows a computing device on the vehicle to make a presumption to the identity of the current driver.

From block 312, the process proceeds to block 320 in which, upon detecting the strong indicator, the computing device of the vehicle may look for secondary indicators to help identify the driver.

The secondary indicators may be data from any of sensors 122, 132 or 142 from the embodiment of FIG. 1. In other cases, the secondary factors may be from the machine learning module 162. Other examples of secondary factors would also be known to those in the art.

For example, the secondary factors at block 320 may be the seat and/or mirror positions, which may be checked to determine whether such positions are within a threshold expected distance of the settings for a particular driver. The check would start with the presumed driver from block 312 but may then check other registered driver positions.

In other cases, a weight sensor within a seat may determine that the driver is within a threshold weight around a known driver weight. Such known driver weight may be preconfigured and stay static or may vary each time the driver starts the vehicle and is positively identified.

In other cases, a device streaming to an infotainment system can be checked against known devices for authorized drivers.

In other cases, defaults in the climate control system could be checked against the current operation of the vehicle.

In other cases, the input may be from a machine learning algorithm. The use of the machine learning algorithm would require that the vehicle be driven for a certain amount of time in order to confirm the current driver identity. However, by starting with a presumed driver identity, this time may be reduced.

In particular, a machine learning algorithm may be any neural network or machine learning code which could be taught through a learning phase on the driving characteristics of the particular drivers. For example, a new driver may be required to drive for 20 hours in the vehicle before the machine learning algorithm can definitively identify such driver. Therefore, each authorized driver in a group may enter into a learning state in which the driver teaches the machine learning algorithm or neural network the driving habits of such driver. Thereafter, once the learning stage is finished, the machine learning algorithm may provide input into the vehicle computing device to indicate whether or not the presumed driver is driving the vehicle.

Other options for secondary sensors are also possible.

From block 320 the process proceeds to block 330 in which a mismatch is detected. As will be appreciated by those in the art, a mismatch would be the situation where the expected driver based on the strong indicator is not the driver of the vehicle. The mismatch could catch situations in which the driver is not the expected driver but is still an authorized driver for the vehicle. For example, this may be the situation where the son or daughter of the authorized driver has taken the vehicle and is using a parent's key fob. In a fleet operations situation, it may be the case where the key fob has been lent to an employee that has forgotten their key fob at home. In other cases, when operating a fleet of vehicles, the driver may be recognized but has taken the wrong vehicle. Other examples are possible.

In other situations, the mismatch identified at block 330 may indicate that the driver is unknown. This may be due to a theft or the car being borrowed by a friend without configuring preauthorization of such borrowing. Other options are possible.

If, at block 330, it is determined that the driver of the vehicle is the expected driver, the process may proceed to block 340 and end.

Conversely, if at block 330 is found that a mismatch has occurred, the process may proceed to block 342 in which an action may be performed.

The action performed at block 342 may be determined based on whether the driver of the vehicle could be identified. Thus, for example, if the son or daughter of the authorized driver is found to the driving using a parent's key fob, then the action may simply be to provide an alert to the parent, for example through a text message, email or an app associated with the driving with the vehicle.

In other cases, if the identified driver has driving restrictions, such as not being allowed to go over a certain speed, not being allowed to go on freeways, among other options, then actions may be taken at the vehicle itself. For example, the vehicle may be speed limited to a particular speed.

In other cases, alerts or messages to the driver may be provided. For example, if the driver is not allowed on the freeway, messages may appear on the console or through audio messaging using the speakers indicating that the driver should not be on the freeway and should take the next exit.

In other cases, the action performed at block 342 may associate the driving performance with the actual driver of the vehicle rather than the presumed driver identity based on the key fob. This may be useful in a fleet situation where the fleet operator tracks the performance or driving habits of each driver. Therefore, if the driver is using somebody else's key fob, the driving performance could be associated back to the correct driver.

Further, if the driver is not allowed to be driving the vehicle, for example based on permitted weight restrictions, or if the driver has taken the wrong load, alerts could be provided to the fleet operator and/or to the current driver.

In other cases, if the driver is unknown, other actions may be performed. For example, the action may be to initiate a braking sequence to slow the vehicle down. In other cases, the action may be to cut the ignition once the vehicle is detected to have been stopped.

In still further cases, the action may be to provide regular reports of the vehicle position to a network element such as the authorities, fleet management center, parents, authorized driver, among other options.

In still further cases, the action may be to provide an alert to authorities.

In other cases, the action may be to send a message to a network element providing information regarding the current driver and the presumed driver. In this case, the network element may provide a response indicating an action to be taken by the vehicle computing system.

Other actions are also possible.

As will be appreciated by those in the art, the action may be continuing action in which case of the process continues to loop to block 342 until the vehicle is turned off.

From block 342, the process proceeds to block 340 and ends.

Thus, based on FIG. 3, the time to identify a driver may be reduced by starting with a first indicator uniquely identifying a presumed driver, and then using at least one secondary indicator to confirm the presumed identity.

A computing device such as the vehicle computing system or a network server may be any type of computing device. For example, one simplified computing device that may perform the embodiments described above is provided with regards to FIG. 4.

Figure 4:
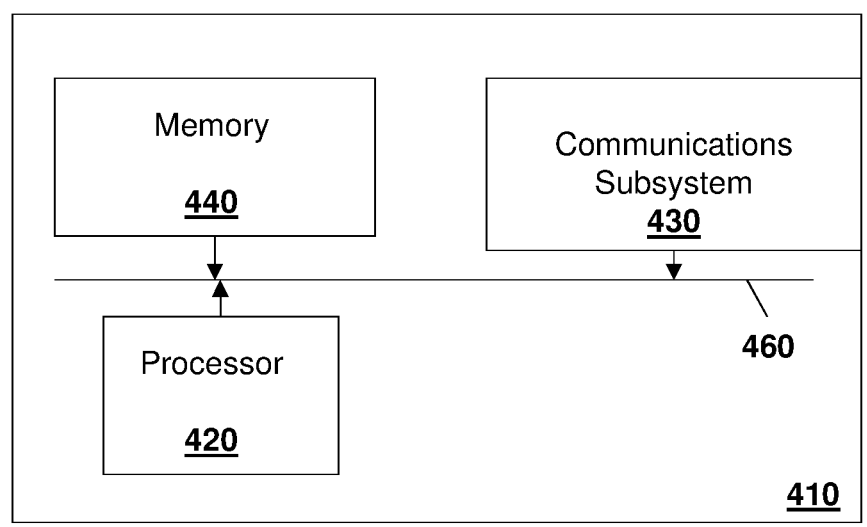
FIG. 4 is a block diagram of an example computing device or server capable of being used with the embodiments of the present disclosure.

In FIG. 4, computing device 410 includes a processor 420 and a communications subsystem 430, where the processor 420 and communications subsystem 430 cooperate to perform the methods of the embodiments described herein.

The processor 420 is configured to execute programmable logic, which may be stored, along with data, on the computing device 410, and is shown in the example of FIG. 4 as memory 440. The memory 440 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 420 may also be implemented entirely in hardware and not require any stored program to execute logic functions.

Alternatively, or in addition to the memory 440, the computing device 410 may access data or programmable logic from an external storage medium, for example through the communications subsystem 430.

The communications subsystem 430 allows the computing device 410 to communicate with other devices or network elements.

Communications between the various elements of the computing device 410 may be through an internal bus 460 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a vehicle computing device for identifying a driver, the method comprising:
   receiving a device identifier from a client device;
   mapping the device identifier to a presumed driver identity, wherein the device identifier is uniquely associated with the presumed driver identity;
   receiving at least one second indicator at the vehicle computing device, the at least one second indicator being a sensor reading from within the vehicle;
   determining an actual driver identity using the at least one second indicator;
   when the actual driver identity is unknown, performing a first action; and
   when the actual driver identity is known but distinct from the presumed driver identity, performing a second action.

2. The method of claim 1, wherein the device identifier is received from a key fob, a mobile device, or a smart key associated with a driver.

3. The method of claim 2, wherein the at least one sensor reading is from at least one of a seat sensor; a mirror sensor; an infotainment system sensor; a climate control sensor; an acceleration sensor; a position sensor; a steering sensor, and a braking sensor.

4. The method of claim 3, wherein determining the actual driver identity compares stored sensor information for the presumed driver with the at least one second indicator.

5. The method of claim 1, wherein the at least one second indicator is an input from a machine learning module comparing a driving profile of a current driver with stored driving profiles.

6. The method of claim 5, wherein the comparing is performed first for a driver profile for the presumed driver identity.

7. The method of claim 1, wherein the first action is at least one of: providing an alert to a network element; causing braking of the vehicle; providing position information to a network element; and disabling an ignition of the vehicle.

8. The method of claim 1, wherein the second action is at least one of providing a message within the vehicle; and speed limiting the vehicle.

9. A vehicle computing device configured for identifying a driver, the vehicle computing device comprising:
   a processor; and
   a communications subsystem;
   wherein the vehicle computing device is configured to:
      receive a device identifier from a client device;
      map the device identifier to a presumed driver identity, wherein the device identifier is uniquely associated with the presumed driver identity;

receive at least one second indicator at the vehicle computing device, the at least one second indicator being a sensor reading from within the vehicle;

determine an actual driver identity using the at least one second indicator;

when the actual driver identity is unknown, performing a first action; and when the actual driver identity is known but distinct from the presumed driver identity, performing a second action.

10. The vehicle computing device of claim 9, wherein the device identifier is received from a key fob, a mobile device, or a smart key associated with a driver.

11. The vehicle computing device of claim 10, wherein the at least one sensor reading is from at least one of a seat sensor; a mirror sensor; an infotainment system sensor; a climate control sensor; an acceleration sensor; a position sensor; a steering sensor, and a braking sensor.

12. The vehicle computing device of claim 11, wherein determining the actual driver identity compares stored sensor information for the presumed driver with the at least one second indicator.

13. The vehicle computing device of claim 9, wherein the at least one second indicator is an input from a machine learning module comparing a driving profile of a current driver with stored driving profiles.

14. The vehicle computing device of claim 13, wherein the comparing is performed first for a driver profile for the presumed driver identity.

15. The vehicle computing device of claim 9, wherein the first action is at least one of: providing an alert to a network element; causing braking of the vehicle; providing position information to a network element; and disabling an ignition of the vehicle.

16. The vehicle computing device of claim 9, wherein the second action is at least one of providing a message within the vehicle; and speed limiting the vehicle.

17. A non-transitory computer readable medium having stored thereon executable code for execution by a processor of a vehicle computing device, the executable code comprising instructions for:

receiving a device identifier from a client device;

mapping the device identifier to a presumed driver identity, wherein the device identifier is uniquely associated with the presumed driver identity;

receiving at least one second indicator at the vehicle computing device, the at least one second indicator being a sensor reading from within the vehicle;

determining an actual driver identity using the at least one second indicator;

when the actual driver identity is unknown, performing a first action; and when the actual driver identity is known but distinct from the presumed driver identity, performing a second action.

* * * * *